July 20, 1965 L. P. HUNTER 3,196,284

LOGICAL SIGNAL PROCESSING APPARATUS

Filed April 21, 1961 4 Sheets-Sheet 1

| | x | y | z | NOT "OR" (H) | (DEG) | AND (A) | SUM TO ONE (D) |
|---|---|---|---|---|---|---|---|
| A | 1 | 1 | 1 | 0 | 0 | 1 | 0 |
| B | 0 | 1 | 1 | 0 | 0 | 0 | 0 |
| C | 1 | 0 | 1 | 0 | 0 | 0 | 0 |
| D | 0 | 0 | 1 | 0 | 1 | 0 | 1 |
| E | 1 | 1 | 0 | 0 | 1 | 0 | 0 |
| F | 0 | 1 | 0 | 0 | 0 | 0 | 0 |
| G | 1 | 0 | 0 | 0 | 1 | 0 | 0 |
| H | 0 | 0 | 0 | 1 | 0 | 0 | 0 |

INVENTOR
LLOYD P. HUNTER

BY Alvin J. Riddles
ATTORNEY

July 20, 1965 L. P. HUNTER 3,196,284

LOGICAL SIGNAL PROCESSING APPARATUS

Filed April 21. 1961 4 Sheets-Sheet 2

United States Patent Office 3,196,284

Patented July 20, 1965

3,196,284

LOGICAL SIGNAL PROCESSING APPARATUS

Lloyd P. Hunter, Poughkeepsie, N.Y., assignor to International Business Machines Corporation, New York, N.Y., a corporation of New York Filed Apr. 21, 1961, Ser. No. 104,608
10 Claims. (Cl. 307—88.5)

This invention relates to the processing of information; and, in particular, to the fabrication of devices capable of achieving more efficient logical connectives between elements of information.

As the art of the processing of information has developed, the manner in which the elements of information are handled has come under study. There has been a recognition in the art that certain logical connectives relating elements of information are more powerful than others, and that when information processing equipment is constructed employing devices capable of realizing these more powerful logical connectives, greater versatility on the part of the functions performed by the machinery is achieved and fewer actual structural components are needed to perform these functions.

In the early development of the art, the logical connectives AND and OR were employed. The art is currently adopting the use of the NOR connective, which is the denial of the OR connective. Recently, studies have been conducted indicating that certain "ternary" or three input variable logical connectives are highly efficient and hence very valuable in constructing information processing devices. The construction of such a device achieving many logical connectives and the efficiency of logical elements are described in the following articles:

"The Multipurpose Bias Device, Part I, the Commutator Transistor," by B. Dunham, in the IBM Journal of Research and Development, vol. 1, No. 2, pages 117 to 129, April 1957; and "The Multipurpose Bias Device, Part II, the efficiency of Logical Elements," by B. Dunham, et al., in the IBM Journal of Research and Development, vol. 3, No. 1, January 1959.

In essence, efforts thus far in the art have shown that certain logical connectives have considerably more power than the more conventional ones used in everyday logic, such as AND, and OR. These logical elements are powerful because they are capable of achieving a plurality of lesser logical connectives by permutation of their inputs so that a single element can be employed to establish a wide range of relationships of elements of information. In the course of the development of the art, it has been determined that of the "quaternary" or four input variable system, one logical connective is capable of achieving a substantial number of possible ternary or three variable logical connectives which in turn are truth functionally equivalent to a large number of four variable logical connectives included in the four variable system. It has been found in the art that of the 65,536 possible four variable logical connectives there are 3,984 logical connectives which are an interchange equivalent of all the logical connectives in the larger total and that a single ternary logical connective can achieve 697 of these interchange connectives. The ternary logical connective capable of achieving this large number of quaternary interchange equivalent connectives is one indicating a positive output under the conditions that either a particular first variable is present or that particular second and particular third variables are present, or that a particular third variable is present and otherwise indicates no output. This logical connective is non-commutative in that the output is dependent not only upon the number of inputs present but also upon which particular ones of those inputs are present.

For purposes of clarification, the information being discussed in connection with this invention is binary by signal level but involves ternary and higher numbers of information sources. In other words, the output regardless of the number of inputs always varies between only two levels and may be represented by a binary 1 or 0.

What has been discovered is a logical principle for the fabrication of powerful higher order logical connectives through the realization of lesser logical connectives combined together in a single realization which is capable of generating an output in response to any selected input condition. The logical principle is combined with a structural principle to provide a single circuit and a single semiconductor device providing all the switching functions of a logical device capable of generating an output in response to any selected input condition of the truth table. The invention is illustrated in connection with the fabrication of a single circuit and a single semiconductor device capable of generating an output under the conditions of the presence of a particular first variable or the presence of particular second and third variables or the presence of a particular third variable and otherwise exhibits no output.

It is a primary object of this invention to provide an improved method of achieving logical connectives.

It is another object of this invention to provide a logical principle for achieving higher order logical connectives.

It is another object of this invention to provide an improved method of fabricating logical devices.

It is another object of this invention to provide a structural principle for achieving higher order logical connectives.

It is another object of this invention to provide an improved semiconductor circuit capable of achieving logical connectives.

It is still another object of this invention to provide a structural principle for fabricating semiconductor logical devices.

It is another object of this invention to provide a circuit structural principle for synthesizing logical switching circuits.

The foregoing and other objects, features and advantages of the invention will be apparent from the following more particular description of a preferred embodiment of the invention, as illustrated in the accompanying drawings.

In the drawings:

FIG. 1 is a truth table describing a comparison of the conventional logical connectives known in the art with one of the more powerful higher order logical connectives achieved through the principles of this invention.

FIG. 2 is a block diagram illustrating the logical principle of the invention in which more powerful higher order logical connectives are achieved through the combination of simpler logical connectives where a binary 1 output occurs for a binary 1 input of a particular single variable and a binary 0 input occurs for all other variables introduced.

Figures 1, 2:
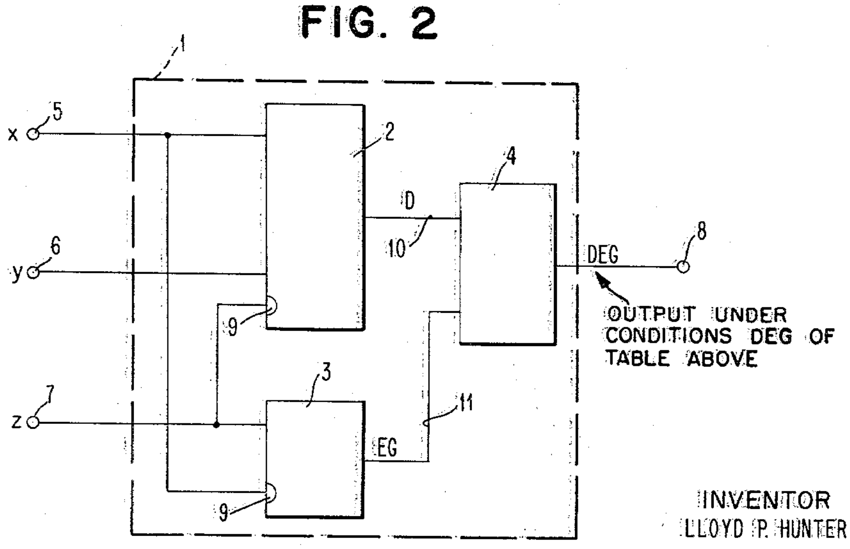
Figure 8:
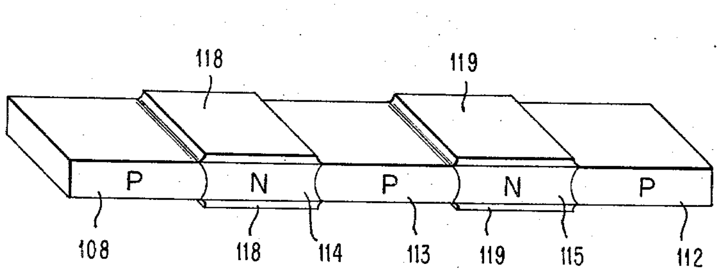
Figure 9:
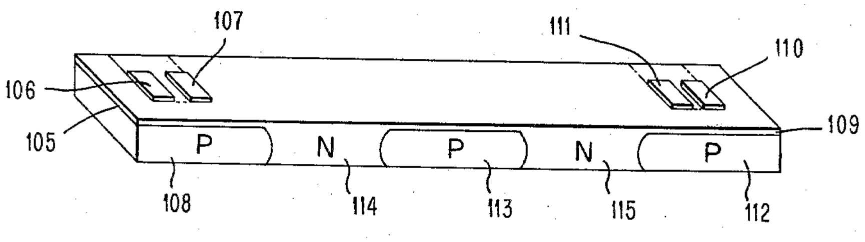
Figure 10:
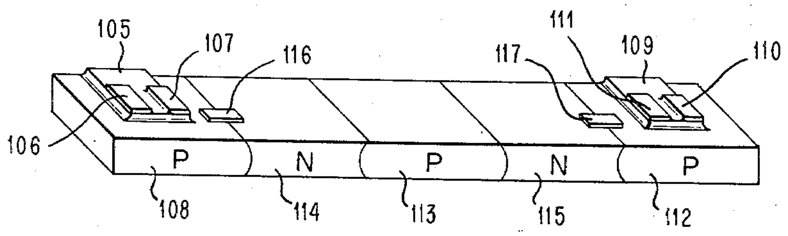

FIGS. 8, 9, and 10 illustrate steps in the fabrication of a single solid state device capable of achieving the logical connective illustrated in the truth table of FIG. 1.

Referring now to FIG. 1, a truth table is shown in which three input variables, *x, y,* and *z,* are present in all possible combination arrangements in Rows A through H. The conventional AND logical connective, well known in the art, appears in a column in which there is an output only for the condition that all three inputs are present. A very useful logical connective, in accordance with the invention, is shown in a column labelled NOT OR in which the output is 0 under all conditions, except in the absence of all three inputs at which time the output is 1. It has been found that a single logical connective where a binary 1 output is realized only on a condition where the sum of all but one of the inputs is zero and the remaining input is a binary 1 is a highly valuable connective in generating specific desired higher order connections. Such single logical connectives will be hereafter referred to as sum to one connectives.

Since there are 256 possible three input variable logical connectives and many more in the higher orders of input variables, it will be apparent that the "proper name" type of designation such as AND, OR, etc. cannot conveniently be employed and for this reason the logical connectives are identified by the letters A through H describing conditions of the truth table in which an output occurs. Thus, it may be seen that under this nomenclature one example of a sum to one logical connective would be a D function and the well-known AND logical connective would be an A function as shown in FIG. 1. Similarly, the logical connective where an output is received in response to the presence of a particular first variable or to the presence of particular second and third variables or to the presence of a particular third variable and otherwise exhibits no output, is a DEG function.

As previously described, the logical function DEG, shown in FIG. 1, is capable of achieving 697 of the 3,984 four input variable interchange logical connectives and hence is very valuable in information processing.

In accordance with the invention, an approach is set forth for the realization of logical connectives of the type of the connective DEG, wherein the outputs of a plurality of sum to one connectives of certain of the input variables are combined in a single alternational device.

Referring next to FIG. 2, a block diagram is shown which exhibits a principle of achieving a selected logical connective of a random non-commutative input condition by combining groups of the input variables in a plurality of sum to one connectives and combining the outputs of the connectives in an alternational device. The diagram of FIG. 2 achieves the logical connective DEG described in FIG. 1. The diagram involves an overall logical block 1 within which are individual separate component blocks designated 2, 3 and 4. The inputs *x, y,* and *z* are introduced to the block 1, respectively, at terminals 5, 6, and 7 and the output is available at terminal 8.

In accordance with the invention, it has been found that truth tables with non-commutative randomly positioned outputs may be fabricated with greatly simplified structure by achieving separate sum to one logical connectives in an alternational device. With the logical principle of the invention, a simple circuit or structure may be farbicated wherein an output may be placed in any one or combination of selected positions of a truth table. Two separate combinations of the inputs are provided to generate a sum to one output for each 1 in the DEG connective truth table.

In the case of the DEG connective in FIG. 1, the first desired 1 is for the input condition D. The condition in the truth table of FIG. 1 for D may be described as *z* only. In the block 2, inputs *x, y,* and *z* are introduced and the *z* input is seen to enter block 2 through element 9 which is meant to indicate that this input is the unique binary 1 input in this sum to one connective. The D output is available on channel 10.

Similarly, in the block 3, an output is realized only when the sum of all variables introduced is one. The next desired outputs from the table of FIG. 1 are for the E and G input conditions. In examining these conditions, it will be noted that an output is desired in the E condition when *y* is present and that an output is desired in the G condition when *y* is not present. Hence, these conditions combined are independent of *y*. The two further both require *x* to be present and *z* to be not present. In view of this, these two functions can be achieved on a single line by combining them in a single sum to one element such as block 3 where *y* is not introduced and *x* enters through the element 9. Thus, the output of block 3 is dependent on *x* only. The output of block 3 is available on channel 11 and is the EG function.

The connectives present on channels 10 and 11 are now combined in an alternational element 4, such as a conventional OR circuit and the DEG logical connective is available at terminal 8.

Thus, in accordance with the invention, a logical principle is set forth whereby a particular logical connective of a large number of variables is realized by providing a sum to one connective for each of a progressively decreasing series of combinations of input conditions where the output is dependent on a single variable. This principle is illustrated in FIG. 2 by providing the element 3 which is a sum to one connective component block for each combination of input conditions where the output is dependent on a single variable and by providing the element 2 which is a sum to one connective component block for each single variable dependent input condition. The outputs of all sum to one connective component blocks are then combined in an alternational circuit. Thus, it will be apparent that with the logical principle of this invention, it is possible with a greatly simplified structure to generate logical connectives having randomly positioned non-commutative outputs.

Figure 3:
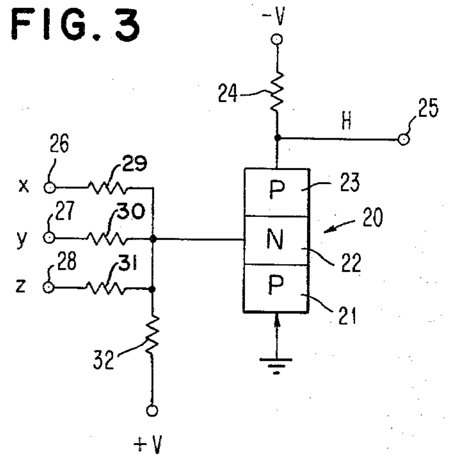
FIG. 3 is a transistor circuit capable of achieving a NOT OR selection logical connective for three input variables.

The logical principle of the invention may be fabricated with transistor-resistor logic, as may be seen from the following discussion. Referring next to FIG. 3, there is shown a well-known transistor-resistor logical circuit capable of realizing the NOT OR logical connective labelled H of FIG. 1. In FIG. 3, a transistor 20 is provided with an emitter 21, base 22, and collector 23 having the emitter connected to ground and having the collector connected through a load impedance 24 to a source of negative potential indicated as —V. An output terminal 25 is available at the collector of the transistor 20. The input variables *x, y,* and *z* are introduced at terminals 26, 27, and 28 respectively, which are in turn connected through current limiting resistors 29, 30, and 31, respectively, to the base 22 of the transistor 20. The transistor 20 is maintained in a cutoff condition by connecting the base 22 through a current limiting resistor 32 to a source of positive potential indicated as +V.

In operation, for the "p–n–p" transistor shown, the transistor is normally cut-off and a negative signal at any one of the signal inputs *x, y,* or *z* will turn the transistor on causing the output at terminal 25 to approach the ground potential of the emitter 21. In the absence of any signals at the inputs, output will be very nearly the source of negative potential —V. Under these circumstances, ground may be described as a binary 0 signal and the —V potential as the binary 1 signal. Hence, this circuit provides an output only in the absence of all inputs, as shown in the table of FIG. 1 for the H connection, and, hence, may be described as a NOT OR or NOR circuit.

Figure 4:
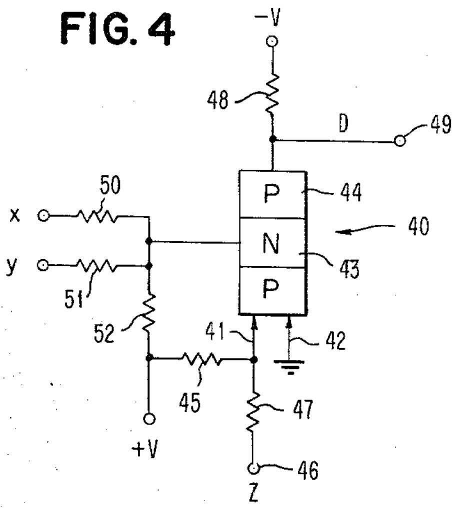
FIG. 4 is a transistor circuit capable of achieving one of the simpler logical connectives responsive to a binary 1 of particular single variable only and a binary 0 for all others introduced.

In FIG. 4, in accordance with the invention, there is shown a transistor-resistor circuit which provides a binary 1 output for an input condition dependent on the presence of one particular variable only and is capable of realizing a sum to one connective for a particular variable. The circuit of FIG. 4 is capable of realizing the condition D of the truth table of FIG. 1; and, hence, is capable of performing the function of the logical device 2 of FIG. 2 which requires an output only for the condition where $z$ is 1 and both $x$ and $y$ are 0. The circuit of FIG. 4 has a transistor 40 having two separate emitter contacts 41 and 42, a base 43 and a collector 44. The transistor 40 may, for example be a "p–n–p" type transistor that is provided with a second minority carrier injecting emitter contact. Such a contact may be provided by cutting one "p" conductivity type region of a conventional "p–n–p" transistor into two parts or by making several rectifying alloy connections to the base region, as shown in U.S. Patent No. 2,910,634. In the circuit of FIG. 4, one minority carrier injecting contact 42 is shown connected to ground and the other minority carrier injecting contact 41 is shown connected through an isolating resistor 45 to a source of positive potential labelled +V. An input variable labelled $z$ is introduced to the injecting contact 41 at terminal 46 through isolating resistor 47. The collector of the transistor 40 is connected to a source of negative potential labelled —V through a load impedance 48 and the output is realized at terminal 49 which is connected to the collector 44 of the transistor. Input variables $x$ and $y$ are introduced through resistors 50 and 51, respectively, to the base 43 of the transistor and the base 43 of the transistor in turn is connected through a current limiting resistor 52 to the source of positive potential +V.

In operation, the emitter contact 41 is normally biased ON through the resistor 45. Inputs $x$ and $y$ operate to overcome a cut-off bias applied to the base 43 of the transistor through resistor 52 to +V so that the presence of either $x$ or $y$ will turn the transistor ON. The presence of a signal at $z$, applied to terminal 46, will operate to overcome the ON bias and to turn the transistor OFF. It will thus be apparent that when there are signals on either $x$ or $y$ or both or when there are no signals on any of the inputs $z$, $y$, or $z$, the transistor 40 will remain conducting. Only when the bias on emitter 41 is turned off by a signal from the $z$ variable and there are no signals from the $x$ or $y$ variables to turn the transistor 40 on, will the transistor 40 turn off and produce an output signal. Under these circumstances, a binary 0, or no output signal, is indicated when the potential at terminal 49 is close to ground and a binary 1, or an output, is indicated when the transistor is turned off and the potential at terminal 49 approaches that of —V.

It will be apparent in the art, that the circuit set forth in connection with FIG. 4, in accordance with the invention, may be employed to generate truth tables having randomly positioned ones produced by non-commutative permutations of inputs.

It will be further apparent to one skilled in the art that as many inputs as are desired within practical transistor loading limits may be introduced to the base of the transistor 40 by extending the input variables in parallel each with an isolating resistor, as has been done for the inputs $x$ and $y$. Similarly, as many inputs as are desired within practical transistor loading limits may be introduced at the injecting contact 41 by extending the inputs in parallel each through an individual isolating resistor, as has been done for the input $z$.

Figure 5:
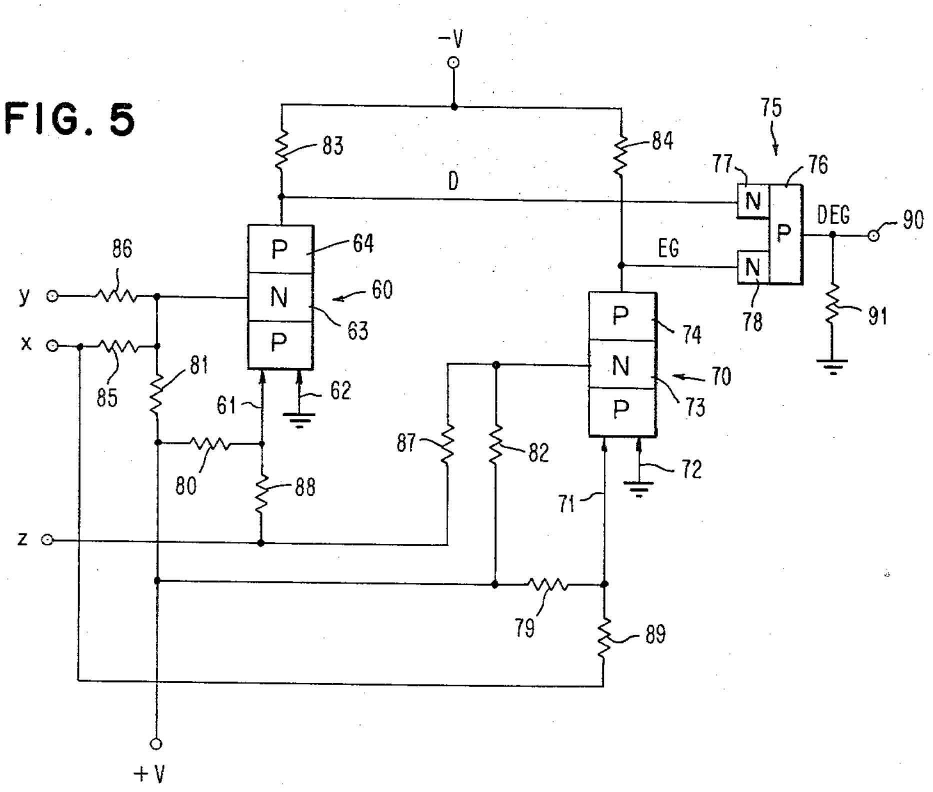
FIG. 5 is a transistor circuit, in accordance with the invention, for achieving the more powerful higher order logical connective illustrated in FIG. 1.

Referring next to FIG. 5, there is shown a circuit implementation of the block diagram of FIG. 2. In FIG. 5, a first transistor 60 is equipped with two emitter contacts 61 and 62, a base 63 and a collector 64, a second transistor 70 is equipped with two injecting emitter contacts 71 and 72, a base 73 and a collector 74 and a solid state OR circuit 75 is made up of a common first conductivity type region 76 to which two separate opposite conductivity type regions 77 and 78, respectively, form diodes. A source of positive potential labelled +V is connected through current limiting resistors 79 and 80 to the injecting contacts 71 and 61, respectively, and also through current limiting resistors 81 and 82 to the transistor bases 63 and 73, respectively. The transistor collectors 64 and 74 are connected, respectively, through load resistors 83 and 84 to a source of negative potential labelled —V.

The input variables $x$, $y$, and $z$ are introduced directly to the bases of the transistors through individual isolating resistors 85, 86, and 87. The $z$ variable is introduced to the contact 61 through isolating resistor 88 and the $x$ input is introduced to the injecting contact 71 through isloating resistor 89. The output of the transistor 60 is connected to the region 77 of element 75 and the output of the transistor 70 is connected to the region 78 of the device 75 so that the two connectives generated are logically combined and the output from the element 75 is available at terminal 90 at which a signal across resistor 91 is developed.

In the circuit of FIG. 5, the transistor 60 and its associated circuitry performs the function of the element 2 of FIG. 2. In operation, it is normally ON so that its collector 64 is essentially at ground potential indicating a binary 0 output and is turned OFF only in the absence of $x$ and the absence of $y$ combined with the presence of $z$. Under this condition, and this condition only, will the transistor be cut-off and the potential of the collector approach to —V and thus exhibit a binary 1 output. This is the condition D of the truth table of FIG. 1. When the collector 64 approaches —V, the junction diode formed between elements 76 and 77 of OR device 75 conducts and an output is available at terminal 90.

In the case of transistor 70, this transistor and its associated circuitry perform the function of the element 3 of FIG. 2. The variable $z$ is connected directly into the base 73 through resistor 87 and the variable $x$ is connected through resistor 89 into the emitter 71. Hence, transistor 70 initially is ON and will be cut-off only on the conditions E and G indicated by the truth table of FIG. 1. Each of these conditions cause the collector 74 to approach —V potential and cause the diode formed by elements 76 and 78 to conduct and the output for these conditions to be realized at terminal 90.

The double diode 75 serves the function of the element 4 of FIG. 2. This block has its output developed across resistor 91 and when either of the input lines to elements 77 or 78 go negative the "p–n" junction associated with that particular contact is biased forward and the output signal at terminal 90 goes negative exhibiting an output indicating a binary 1.

Figure 6:
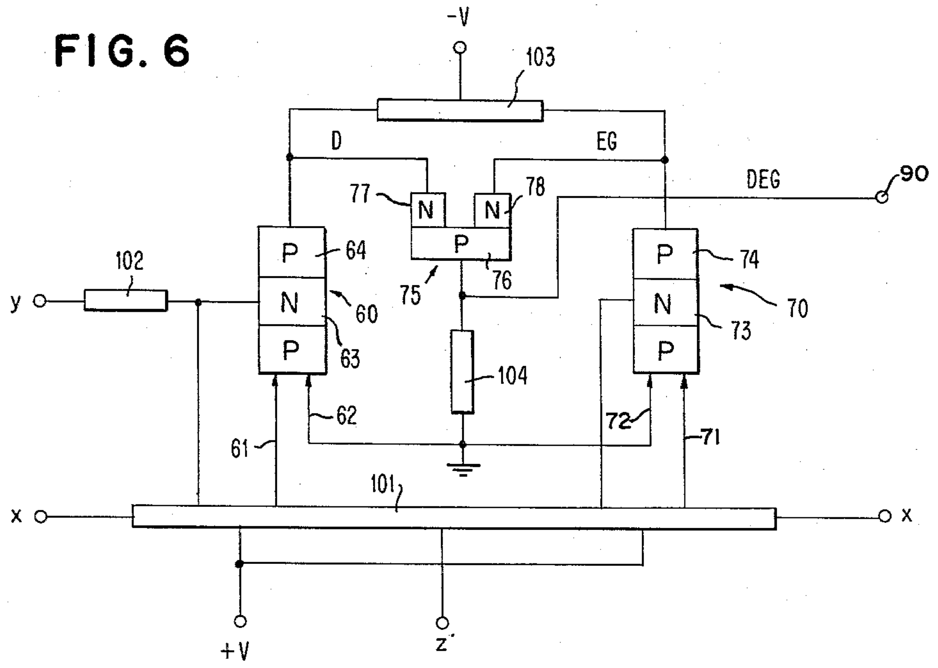
FIG. 6 is a combined resistance semiconductor logical circuit capable of achieving the logical connective illustrated in FIG. 1.

Referring next to FIG. 6, the circuit of FIG. 5 is shown wherein the resistive impedances are combined. The same reference numerals of the circuit of FIG. 5 are shown where identical in FIG. 6. All the input and bias resistances of transistors 60 and 70 have been combined into a single resistance strip with connections made in the proper place to give proper values to each resistance. Such resistance strips are common practice in the printed circuit art and for example, may be made by depositing resistive material by the technique of vapor deposition on a suitable substrate with appropriate connections at specific values. As examples of suitable materials, vacuum deposited metals and vapor grown intermetallic semiconductor materials may be employed. It will be apparent to one skilled in the art that any technique giving appropriate isolation and impedance values and capable of handling the essential power requirements compatible with the circuit may be employed for the resistors shown in connection with this circuit.

Referring now to FIGS. 5 and 6, a resistance strip 101 is employed which includes input and bias resistances with the exception of the input resistance for the variable *y* which is separate and shown as element 102. The load resistances 83 and 84 have been combined into a single center tapped resistance strip 103 and the output signal developing resistance 91 has been made as a separate resistance strip 104. In combining the values of the resistances, as is illustrated in FIG. 6, frequently a single strip, such as the element 101, is put down and where a particular signal is introduced in a number of places to the circuit, the signal itself is introduced into the resistor strip at different points so as to prevent the impedance from increasing as the signal is transported from one place to another. This is accomplished in FIG. 6 by introducing the variable *x* into both ends of the element 101.

Figure 7:
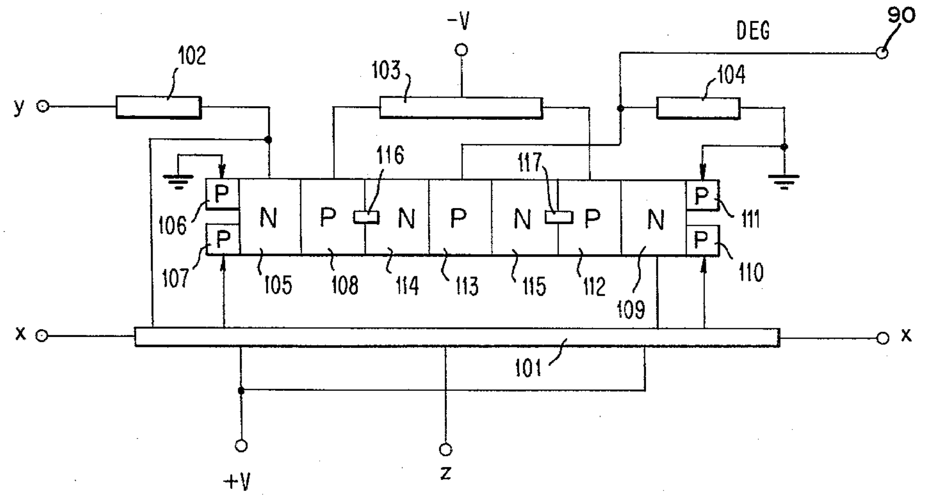
FIG. 7 is a combined element device illustrating the structural principles of the invention.

Referring next to FIG. 7, the semiconductor parts of the circuit may be provided in a single body which is then connected into a circuit using strip resistors. In FIG. 7, the same reference numerals as in previous figures are employed where identical. As previously described in connection with FIG. 6, all input resistances with the exception of that for the variable *y* are combined in a single element 101, the input resistance for the variable *y* is shown as element 102, the load resistors for the transistors are achieved by the center tapped element 103 and the output signal resistor is element 104. In the solid state body, transistor 60 is made up of a zone of a particular conductivity type semiconductor material 105, shown as "n" conductivity type for compatibility with the circuit description. The zone 105 will serve as the base of a transistor corresponding to the base 63 of transistor 60 of FIGS. 5 and 6. Two minority carrier injecting emitter contacts 106 and 107 are provided corresponding to the injecting emitter contacts 61 and 62 of FIGS. 5 and 6 and a collector contact 108 is provided and shown as a zone of "p" conductivity type material. For transistor action, it will be essential that the proximity of the injecting contacts 106 and 107 and the collecting contact 108 across the base region 105 be well within the diffusion distance of minority carriers during the minority carrier lifetime of the particular semiconductor material employed. Similarly, the transistor 70 of FIGS. 5 and 6 is made up of a base region 109, minority carrier injecting emitter contacts 110 and 111 which perform the functions of the emitter contacts 71 and 72, respectively, and a collector zone 112 which corresponds to the collector zone 74. The element 75 of FIGS. 5 and 6 is made up of a common zone 113 of "p" conductivity type semiconductor material, for compatibility with the circuit, which forms a "p-n" junction with two regions of "n" conductivity type semiconductor material 114 and 115 corresponding to elements 77 and 78. The connections from the collectors of the respective transistors to the individual inputs of the OR circuit corresponding tto element 75 of FIGS. 5 and 6 are accomplished by elements 116 and 117, respectively, of low resistance material, which provide the connection by shorting out a high resistance "p-n" junction in the bar of semiconductor material in which the various devices are formed. The remaining connections in the circuit of FIG. 7 serve the purpose of connecting the various elements as described in connection with FIG. 5.

What has been described in connection with FIG. 7 is a solid circuit technique whereby the logical principle shown in connection with FIGS. 1 and 2 and illustrated in circuit form in FIG. 5 is combined into a single composite body of semiconductor material and strips of resistance material. In the structure of FIG. 7, a structural principle is set forth wherein a body of semiconductor material having a plurality of alternate conductivity type regions is provided with connections, and low resistance shorting elements which electrically divide the body up into the various active elements employed in a logical circuit in accordance with the requirements of a truth table for a particular logical connective as shown in FIG. 1. Bodies of the type shown in FIG. 7 may be provided by one skilled in the art in a plurality of ways employed in the semiconductor technology, such as by diffusion, rate growing and vapor growth and appropriate contacts may be applied by alloying.

In order to aid one skilled in the art in practicing the invention, a description is provided in connection with FIGS. 8, 9, and 10 of a preferred manner of fabrication of the semiconductor body employed in FIG. 7.

In FIGS. 8, 9, and 10, identical reference numerals with those of FIG. 7 are provided for clarity. In accordance with the invention, a body of "p" type semiconductor material is employed as a starting point. This body should be monocrystalline and have a resistivity such that it will make good collector region material. A practical size would be approximately 0.20 inch wide by 0.005 inch thick and 0.100 inch long. Approximately one-third of the length from each end, strips 118 and 119 of "n" conductivity type determining impurity bearing material, which conveniently may be a lead-arsenic alloy, are applied. These strips should be on both sides of the bar, as shown in FIG. 8. The bar and the strips 118 and 119 are heated to approximately 800° C. for about 20 hours, in an open tube furnace with a continuous flow of inert gas so that the conductivity type determining impurity bearing material diffuses completely through the bar and forms the "n" regions 114 and 115. The abovementioned time and temperature cycle is approximately correct for arsenic diffusion in germanium, but must be modified if other materials are used. At this point, care must be taken in the choice of such parameters as bar size, time, temperature, and the selection of the impurity insure that the regions 114 and 115 do not spread out and encompass the "p" type regions 108, 112 and 113. Thus, the bar has now been divided into three "p" regions and two "n" regions. The lateral surfaces of the bar are now lapped and etched to remove any "n" type material which may have been deposited on the surfaces due to the diffusion step. Referring to FIG. 9, the next step is to diffuse a thin "n" region 105 of the order of a few tenths of a mil in thickness by using an "n" type impurity in the vapor phase. Strips of "p" type impurity bearing alloy 106, 107, 110 and 111 are deposited on the surface of the thin "n" type skin in the positions illustrated in FIG. 9. These alloys are then briefly heated to approximately 700° C. to fuse and form the two emitter regions of the two transistors. Next, an etching mask of stop off lacquer, well known in the art, is placed over the areas indicated by the dotted lines of FIG. 9, and the "n" type surface layer is etched away from the entire lateral surface of the bar, except in the regions protected by this mask. The resulting structure is shown in FIG. 10, where the remaining "n" type segments of skin are now available to serve as the base layers 105 and 109 of two transistors. The final step in fabrication is to deposit two metallic conductor strips 116 and 117 to short out the specific "p-n" junctions, as shown. Since transistor action is involved, the thickness of the mesa regions 105 and 109 between the contacts 106, 107, 110 and 111 and the junction with the "p" type regions 108 and 112 should be well within the diffusion length of the average injected current carrier in the particular semiconductor material employed. An alternate method of applying the emitter regions 106, 107, 110 and 111 might be diffusion through a mask of a "p" type impurity, rather than alloy as described above.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Apparatus for achieving logical connectives involving at least three variables wherein the information signals vary between two levels and the logical connective achieved has randomly positioned non-commutative output signals comprising in combination: means for providing a sum to one logical connective for each of a progressively decreasing series of combinations of input conditions where the output is dependent on a single variable and further means for combining the outputs of each said sum to one connective provided in a single alternational device.

2. Apparatus for achieving logical connectives exhibiting at least two output signals each for a separate input condition of at least three input variables wherein the signals vary between two levels comprising in combination: means for providing a sum to one connective for each input condition for which an output is desired, and further means for providing a single alternational device employing as inputs the output of each said sum to one connective.

3. Apparatus for achieving logical connectives involving at least three input variables wherein the information signals vary between two levels comprising in combination: means for providing a sum to one connective for each input condition dependent upon a single variable, means for providing a sum to one connective for each combination of input conditions where an output is dependent upon a single variable; and, means for providing a single alternational device employing as inputs the output of each sum to one connective.

4. Apparatus for achieving logical connectives involving at least three variables wherein the information signals vary between two levels and the logical connective achieved has randomly position non-commutative output signals comprising in combination: means for providing a sum to one logical connective for each single variable dependent input condition; means for providing a sum to one logical connective for each combination of input conditions where the output of said combination of conditions is dependent upon a single variable and means for combining the outputs of each sum to one connective in a single alternational device.

5. A sum to one logical connective transistor circuit comprising in combination: a transistor having a base of one conductivity type, a collector of an opposite conductivity type and first and second minority carrier injecting emitter contacts positioned on said base region within the diffusion distance of the average minority carrier during the carrier lifetime of the semi-conductor material of said collector across said base region, means connecting said collector to a source of power having a first polarity through a load impedance, means connecting said base to a source of power having a polarity opposite to said first polarity through a biasing impedance, means connecting at least one input variable to said base region each said variable being connected through an isolating impedance, means connecting said first minority carrier injecting contact to a reference potential, means connecting said second minority carrier injecting contact to said opposite polarity source of power through a biasing impedance, and means introducing at least one input variable to said second minority carrier injecting contact each said variable being connected through a separate isolating impedance.

6. A sum to one logical circuit comprising in combination: a two emitter transistor having one emitter thereof connected to a reference potential and having the collector thereof connected to a first polarity power source through a load impedance, means biasing said second emitter to establish conduction in said transistor, means biasing the base of said transistor to prevent conduction in said transistor, means introducing at least one input vairable signal into the base of said transistor in a polarity operable to overcome said biasing means preventing conduction in said transistor, each said input variable signal being introduced through a separate isolating impedance and means introducing each through a separate isolating impedance at least one input variable signal to said second emitter contact of said transistor in a polarity operable to overcome said biasing means establishing conduction in said transistor.

7. A sum to one logical circuit comprising in combination: a two emitter transistor having one emitter thereof connected to a reference potential and having the collector thereof connected to a first polarity power source through a load impedance, means biasing said second emitter to establish conduction in said transistor, means biasing the base of said transistor to prevent conduction in said transistor, means introducing at least one single polarity input variable signal into the base of said transistor, said single polarity being operable to overcome said biasing means preventing conduction in said transistor, each said input variable signal being introduced through a separate isolating impedance and means introducing each through a separate isolating impedance at least one input variable to said second emitter contact of said transistor, each said input variable signal introduced at said second emitter contact being of the same polarity as each said input variable introduced at said base and operable to overcome said biasing means establishing conduction in said transistor.

8. A logical circuit for achieving logical connectives having randomly positioned non-commutative outputs that are binary by signal level, occasioned in response to input conditions involving at least three input variables comprising: at least two sum to one logical connectives having their outputs combined in an OR circuit.

9. A logical circuit comprising: a first and a second transistor each transistor having two emitters, each transistor having the collector thereof, each through a separate load impedance, connected to a source of power having a first polarity, each said transistor having the base thereof connected to a source of power having an opposite polarity through a biasing resistor, each said transistor having a first emitter thereof connected to a source of reference potential, each said transistor having the second emitter thereof connected to said source of power having said opposite polarity through a biasing resistor, means introducing a first and a second input variable into the base of said first transistor, means introducing a third input variable into the emitter of said first transistor, means introducing said third input variable into the base of said second transistor and means introducing said second input variable into the emitter of said second transistor, and OR circuit means having a first input connected to the collector of said first transistor and having a second input connected to the collector of said second transistor.

10. A logical circuit comprising: a first and a second two emitter "p-n-p" type transistors, each transistor having the collector thereof returned to a source of negative polarity power, each through a separate load impedance, each said transistor having the base thereof connected to a source of positive polarity power through a biasing resistor, each said transistor having a first emitter thereof connected to a source of reference potential, each said transistor having the second emitter thereof connected to said source of positive polarity power through a biasing resistor, means introducing a first and a second input variable into the base of said first transistor, means introducing a third input variable into the emitter of said first transistor, means introducing said third input variable into the base of said second transistor and means introducing said second input variable into the emitter of said second transistor, and OR circuit means having a first input connected to the collectors of said first transistor and having a second input connected to the collector of said second transistor.

(References on following page)

References Cited by the Examiner

UNITED STATES PATENTS

| | | | |
|---|---|---|---|
| 2,603,746 | 7/52 | Burkhart | 328—93 |
| 2,903,606 | 9/59 | Curtis | 307—88.5 |
| 2,936,384 | 5/60 | White | 307—88.5 |
| 2,953,693 | 9/60 | Philips | 307—88.5 |
| 3,005,937 | 10/61 | Wallmark et al. | 307—88.5 |
| 3,015,762 | 1/62 | Shockley | 307—88.5 |

OTHER REFERENCES

Lathrop et al., "Semiconductor Networks for Microelectronics," Electronics, May 13, 1960, pages 69–78.

Pub. 1, Electronic Design, July 1959, pages 84 and 85, "Two Transistor N Input Exclusive OR," Stanley Maki.

JOHN W. HUCKERT, *Primary Examiner.*

HERMAN KARL SAALBACH, ARTHUR GAUSS, *Examiners.*